H. H. LANDIS.
CALK ATTACHMENT FOR HORSESHOES.
APPLICATION FILED DEC. 20, 1916.
1,334,705.
Patented Mar. 23, 1920.
2 SHEETS—SHEET 1.
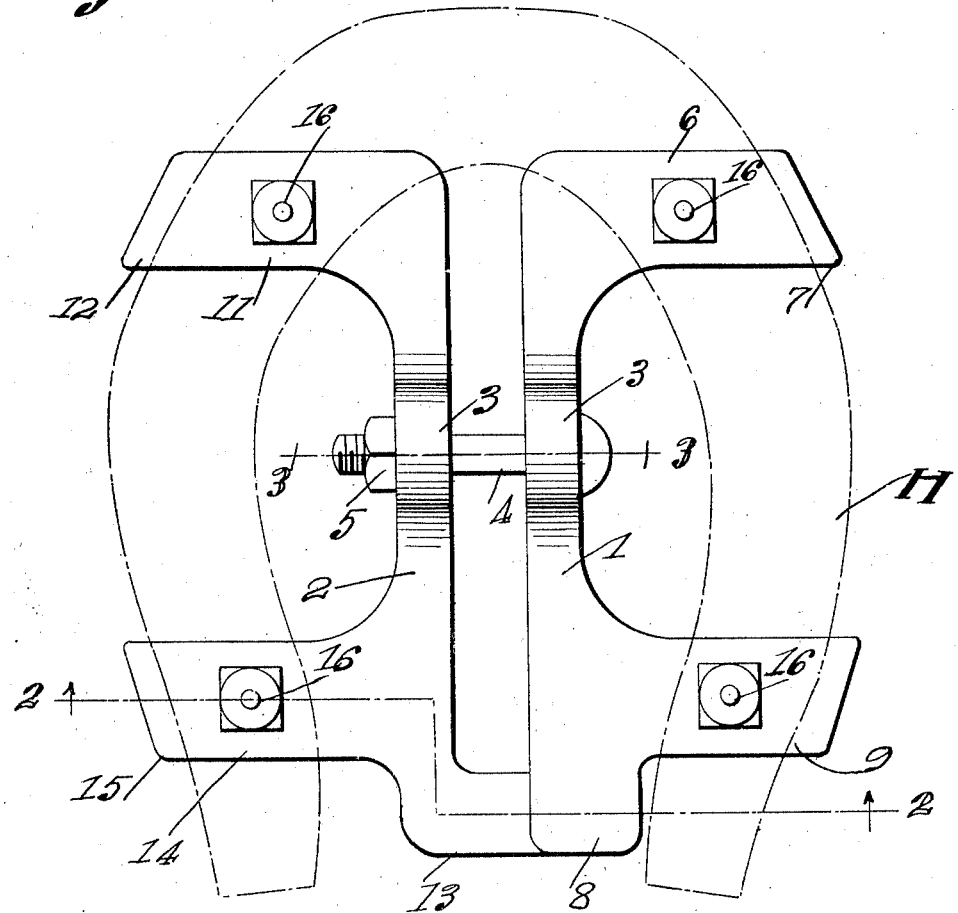
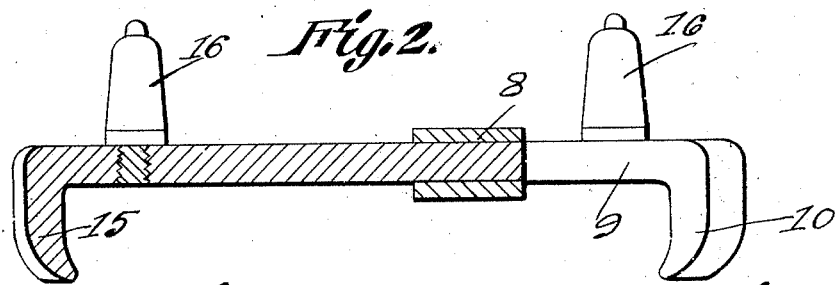
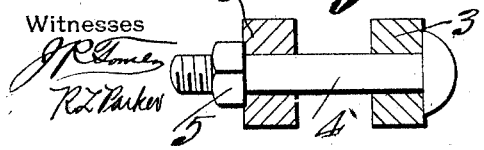
H. H. Landis
Inventor H. H. LANDIS.
CALK ATTACHMENT FOR HORSESHOES.
APPLICATION FILED DEC. 20, 1916.
1,334,705.
Patented Mar. 23, 1920.
2 SHEETS—SHEET 2.
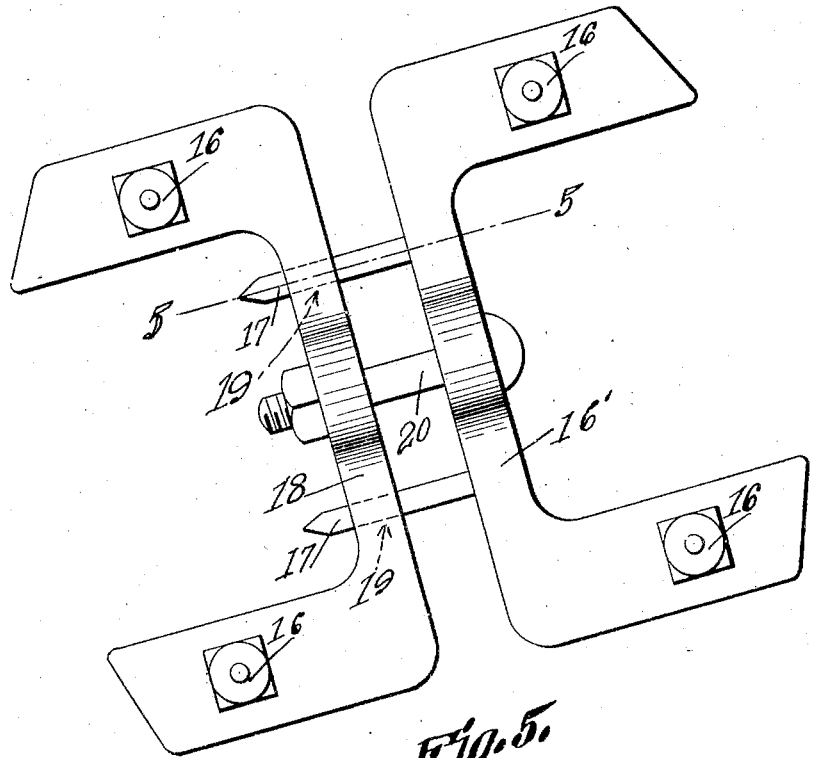
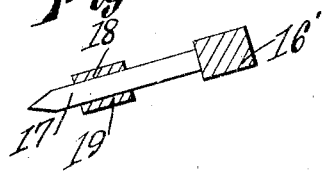

UNITED STATES PATENT OFFICE.

HARRY H. LANDIS, OF TELFORD, PENNSYLVANIA.

CALK ATTACHMENT FOR HORSESHOES.

1,334,705.   Specification of Letters Patent.   Patented Mar. 23, 1920.

Application filed December 20, 1916. Serial No. 138,019.

*To all whom it may concern:*

Be it known that I, HARRY H. LANDIS, a citizen of the United States, residing at Telford, in the county of Bucks and State of Pennsylvania, have invented a new and useful Calk Attachment for Horseshoes, of which the following is a specification.

This invention relates to calk attachments for horseshoes, one of its objects being to provide a simple and compact device of this character which can be applied readily to horseshoes of different sizes and which can be easily removed therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a bottom plan view of the attachment, the position of a horseshoe relative thereto being indicated by dotted lines;

Fig. 2 is a section on line 2—2, Fig. 1;

Fig. 3 is a section on line 3—3, Fig. 1;

Fig. 4 is a view similar to Fig. 1, but showing a modified structure; and

Fig. 5 is a section on line 5—5, Fig. 4.

Referring to the figures by characters of reference, 1 and 2 designate opposed strips having eyes 3 at the centers thereof for the reception of a transverse bolt 4. This bolt is engaged by a nut 5 whereby the two strips 1 and 2 can be readily adjusted toward each other. Strip 1 is provided at one end with a laterally extending arm 6 at the outer or free end of which is provided an ear 7 for engaging one side of a horseshoe H. The other end of the strip 1 is forked as at 8 and is formed, adjacent said forked end, with a laterally extending arm 9 provided with a shoe-engaging ear 10.

The strip 2 is provided at one end with a laterally extending arm 11 corresponding with the arm 6 and also provided with a shoe-engaging ear 12. The other end of the strip 2 is formed with an L-shaped extension or tongue 13 adapted to be inserted laterally into the forked end 8. Adjacent this extension is a laterally projecting arm 14 having a terminal ear 15 for engaging one side of a shoe. It is to be understood that the ears 7, 10, 12 and 15 are also similarly shaped, the free ends thereof being preferably bent inwardly so as to lap the top face of the shoe and engage it close to the hoof, and that the arms 7, 11, and 9, 14, are in alinement.

The calks 16 are arranged wherever desired upon the arms 6, 9, 11 and 14 and can be of the usual or any preferred construction.

When it is desired to apply the attachment to a shoe the two strips 1 and 2 are placed on the bottom of the shoe and are then drawn toward each other so that the ears 7, 10, 12 and 15 will engage the sides of the shoe as shown in Fig. 1. The bolt 14 is then inserted through the eyes 3 and tightened therein by means of the nut 5, this bolt being used to draw the strips 1 2 toward each other until the ears firmly engage the sides of the shoe. Consequently, accidental detachment of the device from the shoe is prevented. Whenever it is desird to remove the attachment from the shoe it is merely necessary to loosen the bolt 4 sufficiently to enable the ears to become disengaged from the shoe, it being seen that the extension 8 and tongue 13 coöperate with this adjustable connection to hold the strips or members against relative movement when either on or off the shoe.

Instead of constructing the device as illustrated in Figs. 1 to 3 inclusive, one of the members, 16', may be provided with laterally extending pins 17 and the other member 18 may be provided with openings 19 to receive these pins, as shown in Figs. 4 and 5. Obviously by utilizing two bolts 20 instead of one bolt, one of the pins 17 can be dispensed with.

What is claimed is:—

A calk attachment for horseshoes, including a pair of oppositely disposed members each having a pair of laterally extending shoe-engaging arms near the ends thereof, the arms of each pair alining with the corresponding arms of the other pair, a single adjustable connection between the members adjacent the center of the inner sides thereof, a forked extension projecting rearwardly from one of the members, and a laterally extending tongue at the rear end of the other member and shiftable within the forked extension, said extension and tongue coöperating with the adjustable connection to hold the members against relative movement when on or off a shoe.

In testimony that I claim the foregoing as my own I have hereto affixed my signature in the presence of two witnesses.

HARRY H. LANDIS.

Witnesses:
B. D. ALDERFER,
MARY A. ALDERFER.